(12) United States Patent
Erceg et al.

(10) Patent No.: US 12,264,018 B1
(45) Date of Patent: Apr. 1, 2025

(54) VARIABLE DISCHARGE DIVERTER

(71) Applicant: Mantissa Corporation, Charlotte, NC (US)

(72) Inventors: David Patrick Erceg, Concord, NC (US); Gonzalo Sotelo, Charlotte, NC (US)

(*) Notice: Subject to any disclaimer, the term of this patent is extended or adjusted under 35 U.S.C. 154(b) by 132 days.

(21) Appl. No.: 17/371,229

(22) Filed: Jul. 9, 2021

Related U.S. Application Data

(60) Provisional application No. 63/050,976, filed on Jul. 13, 2020.

(51) Int. Cl.
*B65G 47/46* (2006.01)

(52) U.S. Cl.
CPC .................... *B65G 47/46* (2013.01)

(58) Field of Classification Search
CPC ........................................ B65G 47/46
See application file for complete search history.

(56) References Cited

U.S. PATENT DOCUMENTS

| | | | | |
|---|---|---|---|---|
| 3,138,238 A * | 6/1964 | De Good | ............... | B65G 13/10 198/525 |
| 5,588,520 A * | 12/1996 | Affaticati | ............... | B65G 47/31 198/502.2 |
| 5,655,643 A * | 8/1997 | Bonnet | ................ | B65G 47/766 198/370.08 |
| 5,732,609 A * | 3/1998 | Marschke | .............. | B65H 35/08 83/167 |
| 6,050,390 A | 4/2000 | Fortenbery et al. | | |
| 7,017,730 B2 * | 3/2006 | Mills | ....................... | B65G 47/82 198/351 |
| 7,032,741 B1 | 4/2006 | Fortenbery et al. | | |
| 7,290,646 B2 * | 11/2007 | Mustalahti | .............. | B66B 21/12 198/334 |
| 7,311,303 B2 * | 12/2007 | Gonzalez | ............... | B65H 31/24 414/790.7 |
| 8,376,663 B2 | 2/2013 | Erceg et al. | | |
| 8,807,320 B2 | 8/2014 | Fortenbery et al. | | |
| 8,919,529 B1 * | 12/2014 | Erceg | ................... | B65G 47/962 198/360 |
| 9,102,336 B2 * | 8/2015 | Rosenwinkel | ....... | H04B 10/114 |
| 10,988,327 B1 * | 4/2021 | Layne | ................ | B65G 47/5181 |
| 11,983,657 B2 * | 5/2024 | Carpenter | .......... | G05B 19/4155 |
| 2007/0034478 A1 * | 2/2007 | Wolf | ...................... | B65G 21/06 198/370.1 |
| 2020/0161111 A1 * | 5/2020 | Cooks | ................. | H01J 49/0081 |
| 2023/0109653 A1 * | 4/2023 | Pant | ..................... | B65G 11/203 198/348 |

\* cited by examiner

*Primary Examiner* — Gene O Crawford
*Assistant Examiner* — Lester Rushin, III
(74) *Attorney, Agent, or Firm* — MacCord Mason PLLC

(57) ABSTRACT

A multi position diverter for parcel handling. In one embodiment, the device has a conveying track; at least one unloading station; and a powered discharge diverter to receive and sort an item from the unloading station. In certain examples, the positioner assembly selectively positions the powered discharge diverter.

20 Claims, 11 Drawing Sheets

VARIABLE DISCHARGE DIVERTER

This application claims the benefit of provisional application No. 63/050,976, filed Jul. 13, 2020, which is incorporated herein by reference in its entirety.

BACKGROUND

Field

The present inventions relate generally to sorting conveyor systems, and more particularly to a multi-position unloading station for item handling.

SUMMARY

In accordance with the present disclosure, item sorting conveyor systems and apparatuses are provided. These inventions provide an improved conveyor system and sortation apparatus that is convenient, efficient and safe for the user, particularly when used to discharge small and variable parcels from a conveyor system.

In one embodiment, a sorting conveyor includes a conveying track; at least one unloading station; a powered discharge diverter adapted to sort an item from said unloading station; and a positioner assembly adapted for selectively positioning said powered discharge diverter.

In one example, the positioner assembly selectively positions said powered discharge diverter between a first collector and a second substantially vertically offset second collector. The powered discharge diverter may provide sensitive delivery of an item, for instance to correspond to an item size, weight, packaging material, or other characteristic, from said track to a downstream collector. The positioner assembly may include slider crank assembly adapted to selectively position the discharge diverter. The powered discharge diverter may deliver a predetermined acceleration profile. The acceleration profile may correspond to a predetermined item speed discharged at said unloading station. The powered discharge diverter may deliver a predetermined deceleration profile. The deceleration profile may correspond to a predetermined item speed discharged at said unloading station.

In certain examples, the powered discharge diverter provides a variable discharge speed. The variable discharge speed may dampen a speed of an item exiting said track. The variable discharge speed may support variable downstream chutes. The variable downstream chutes may be an inclined discharge chute, a declined discharge chute, the like, and a combination thereof.

In one embodiment, a sorting conveyor system includes a conveying track; at least one unloading station; and a discharge diverter adapted to receive an item from said unloading station, said discharge diverter including at least one powered surface for selectively diverting said item between a first collector and a substantially vertically offset second collector.

In one example, a positioner assembly selectively positions said discharge diverter between said first collector and said second substantially vertically offset second collector. The positioner assembly may include a slider crank assembly. The slider crank assembly may selectively position the discharge diverter between at least two substantially parallel collector axes. The discharge diverter may deliver a smooth acceleration profile. The acceleration profile may correspond to a predetermined item speed discharged from said track. The discharge diverter may deliver a smooth deceleration profile. The deceleration profile may correspond to a predetermined item speed discharged from said track.

In particular examples, the discharge diverter provides a variable discharge speed. The variable discharge speed may dampen a speed of an item exiting said track. The variable discharge speed may support variable downstream chutes. The variable downstream chutes may be an inclined discharge chute, a declined discharge chute, the like, and a combination thereof.

In one embodiment, a transition zone multi-position chute for receiving an item discharged at an unloading station by a sorting conveyor system having a conveyor track, said transition zone multi-position chute includes an inlet adjacent to said conveying track at said unloading station for receiving said item; a powered positionable discharge diverter; and a plurality of collectors downstream of said powered positionable discharge diverter.

In one example, the powered positionable discharge diverter is substantially flat to receive said item discharged by said sorting conveyor system. The powered positionable discharge diverter may divert to an alternative position independent of said product item location on said apparatus. The powered positionable discharge diverter may divert to an alternative position before an item enters a collector. The powered positionable discharge diverter may divert to an alternative position before an item clears a downstream chute. The powered positionable discharge diverter may divert to an alternative position independent of an electronic indicator. The powered positionable discharge diverter surface may include a wear-resistant discharge surface. The discharge surface may include a variable belt surface.

In particular examples the powered positionable discharge diverter is selectively positionable between at least two parallel planes. The two parallel planes may correspond to a first collector chute and a second collector chute. The powered positionable discharge diverter is may be positionable between three parallel planes. The apparatus may include a third bulk collector. The powered positionable discharge diverter surface may include a powered belt. The assembly may position said powered positionable discharge diverter between alternative positions. The positioner assembly may include a slider crank assembly.

In certain examples, the apparatus includes a sidewall assembly. The sidewall assembly may include an upstream sidewall extending substantially along the length of said discharge diverter. Further, the sidewall assembly may include a downstream sidewall extending substantially downstream of said discharge diverter.

In particular examples, the apparatus includes a plurality of powered positionable discharge diverters. The apparatus may include a plurality of collectors aligned adjacent said plurality of powered positionable discharge diverters. The apparatus may include a fixed base assembly. The base assembly may include chute supports.

In one embodiment, a sorting conveyor system includes a conveying track; a plurality of tilt trays having a discharge; and a powered discharge diverter adjacent said tilt tray discharge adapted to receive an item from said tilt tray, and wherein said powered discharge diverter selectively diverting said item between a plurality of substantially parallel downstream collectors.

In one example, a positioner assembly selectively positions said powered discharge diverter between said plurality of collectors. The system may include a collector assembly positioned adjacent to said powered discharge diverter. The collector assembly may include a first bulk collector having a collector access. The collector assembly may include a second bulk collector substantially parallel to said first bulk collector and having a collector access. The powered discharge diverter may deliver a predetermined acceleration profile. The acceleration profile may correspond to an item characteristic discharged from said tilt tray. The powered discharge diverter may deliver a predetermined deceleration profile. The deceleration profile may correspond to a predetermined item characteristic discharged from said tilt tray.

In certain examples, the discharge diverter may provide a variable discharge speed. The variable discharge speed may dampen a speed of a predetermined item exiting said tilt tray. The variable discharge speed may correlate to variable downstream chutes. The powered discharge diverter may include divert to an alternative position independent of said item location on said system. The powered discharge diverter may include divert to an alternative position before an item clears a collector. The powered discharge diverter may divert to an alternative position before an item clears a downstream chute. The powered discharge diverter may include divert to an alternative position independent of a visual indicator. The powered discharge diverter surface may include a powered belt assembly.

In one embodiment, a sorting conveyor system includes a conveying track; at least one cross belt having a discharge; and a powered discharge diverter adjacent said discharge adapted to receive an item from said discharge, said powered discharge diverter selectively diverting said item between a plurality of substantially parallel downstream collectors.

In one example, the system includes a positioner assembly adapted for selectively positioning said powered discharge diverter between said plurality of collectors. The system may include a collector assembly positioned adjacent to said powered discharge diverter. The collector assembly may include a first bulk collector having a collector access. The collector assembly may include a second bulk collector substantially parallel to said first bulk collector and having a collector access. The powered discharge diverter may deliver a predetermined acceleration profile. The acceleration profile may correspond to an item characteristic discharged from said cross belt. The powered discharge diverter may deliver a predetermined deceleration profile. The deceleration profile may correspond to a predetermined item characteristic discharged from said cross belt.

In certain embodiments, the powered discharge diverter may provide a variable discharge speed. The variable discharge speed may dampen a speed of a predetermined item exiting said cross belt. The variable discharge speed may correlate to variable downstream chutes. The powered discharge diverter may divert to an alternative position independent of said product item location on said apparatus. The powered discharge diverter may include divert to an alternative position before an item enters a collector. The powered discharge diverter may divert to an alternative position before an item clears a downstream chute. The powered discharge diverter may divert to an alternative position independent of a visual indicator. The powered discharge diverter surface may include a powered belt assembly.

The above summary is intended to summarize certain embodiments of the present inventions. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the inventions will be better understood by a reading of the Description of the Embodiments along with a review of the drawings, in which.

DESCRIPTION OF THE EMBODIMENTS

Figure 1:
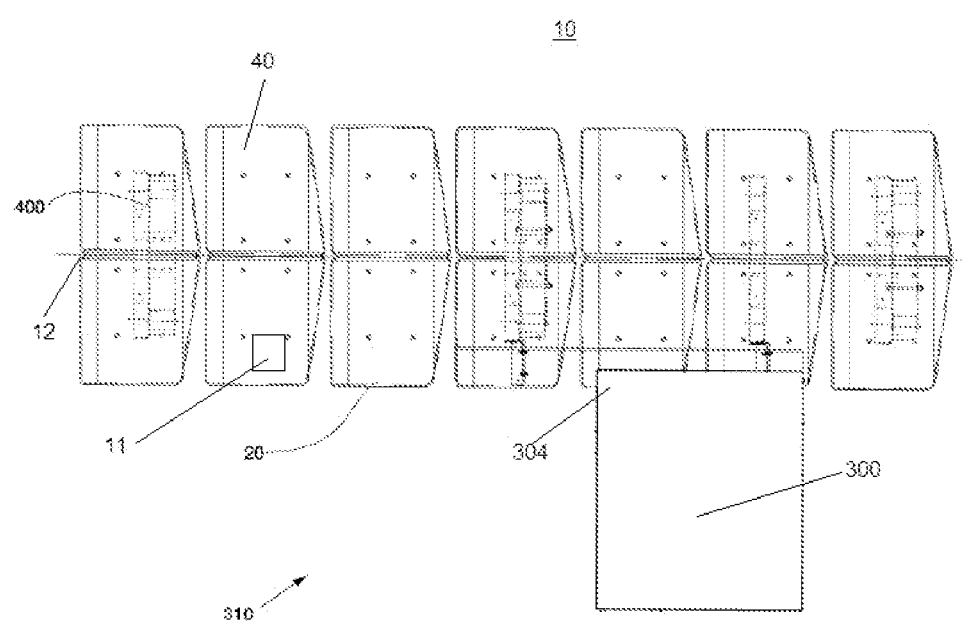
FIG. 1 is a top view of a conveying system according to one embodiment constructed according to the present inventions.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 4:
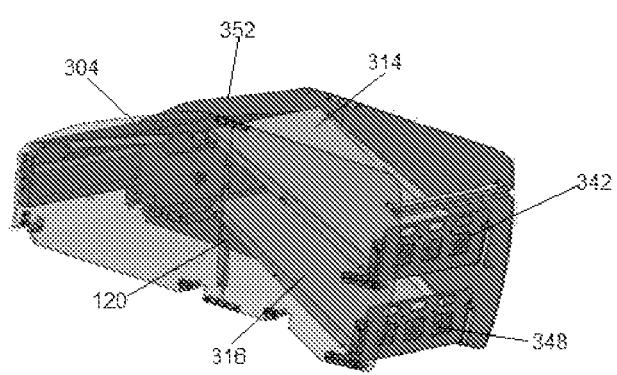
FIG. 4 is a side perspective view of one embodiment of an isolated discharge diverter assembly in a first position, with elements removed for clarity.
Figure 6:
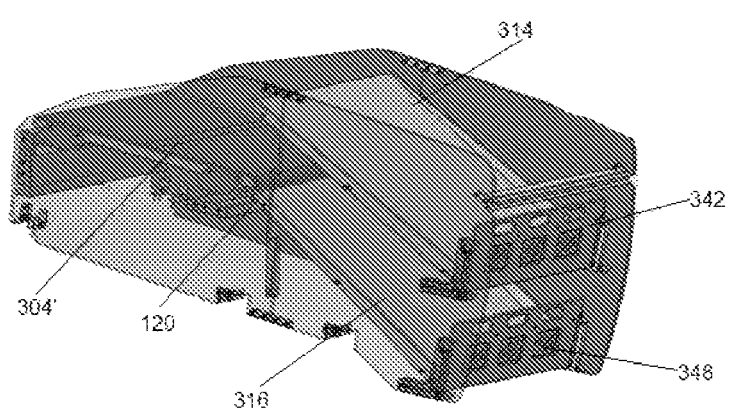
FIG. 6 is a side perspective view of one embodiment of an isolated discharge diverter assembly in a second position, with elements removed for clarity.

Referring now to the drawings in general, and FIGS. 1, 4 and 6 in particular, it will be understood that the illustrations are for the purpose of describing embodiments of the inventions and are not intended to limit the inventions or any invention thereto. As best seen in FIG. 1, a sorting conveyor is shown embodied according to the present inventions for transporting and sorting items or other objects. In one embodiment, the sorting conveyor includes a train of individual carts 20, or in alternative embodiments at least one cross belt, connected end to end, which may form an endless loop around a closed conveyor track 12. Alternately, the conveyor carts 20 of the present inventions herein could be used singly or as part of a finite train. Generally, the package sorting conveyor 10 includes four major sub-assemblies: a conveyor track 12; an opposed roller motor assembly 70; the train of tilting conveyor carts 20, which are moved along the conveyor track 12 by an opposed roller motor assembly 70; and a tilting mechanism 80 for tilting the conveyor carts 20 to discharge packages 11 therefrom, as described in U.S. Pat. No. 6,367,610 entitled HIGH EFFICIENCY SORTING CONVEYOR, issued Apr. 2, 2002, which is hereby incorporated by reference in its entirety.

In some embodiments, each cart 20 may be built around a base trailer frame structure to which other components of each cart 20 are mounted. Mounted atop the trailer frame structure of each conveyor cart 20 may be a tiltable support apparatus, which supports the carrying tray thereabove. In particular examples, the tiltable support supports the carrying tray above the trailer frame structure and allows tilting of the carrying tray toward either side of the sorting conveyor 10, for instance to unload a package into one of the unloading stations, for instance a transition zone multi-position downstream sorting chutes, or the like, as described hereinafter. Again, alternative embodiments include a cross belt assembly, versus a tilt tray, as recognized by those skilled in the art having the benefit of this disclosure.

Figure 2:
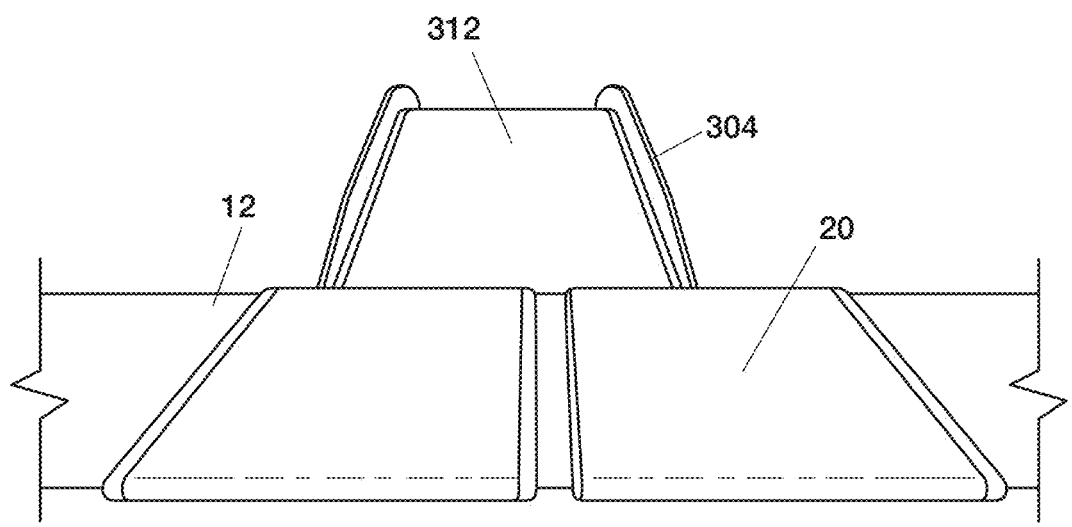
FIG. 2 is a side perspective view of the embodiment of FIG. 1, where a discharge diverter positioned adjacent to the line of conveyor carts, previously introduced in FIG. 1.
Figure 3:
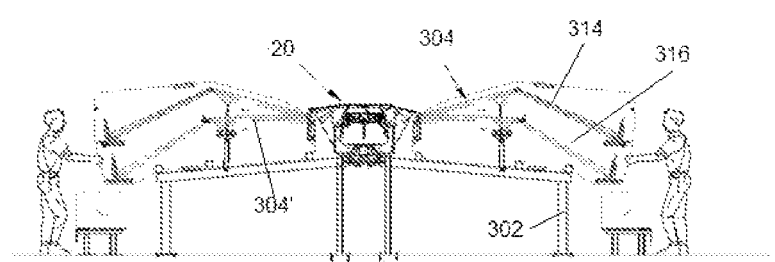
FIG. 3 is a side view of the embodiment of FIG. 1, where a discharge diverter chute is positioned in a first and a second position
Figure 5:
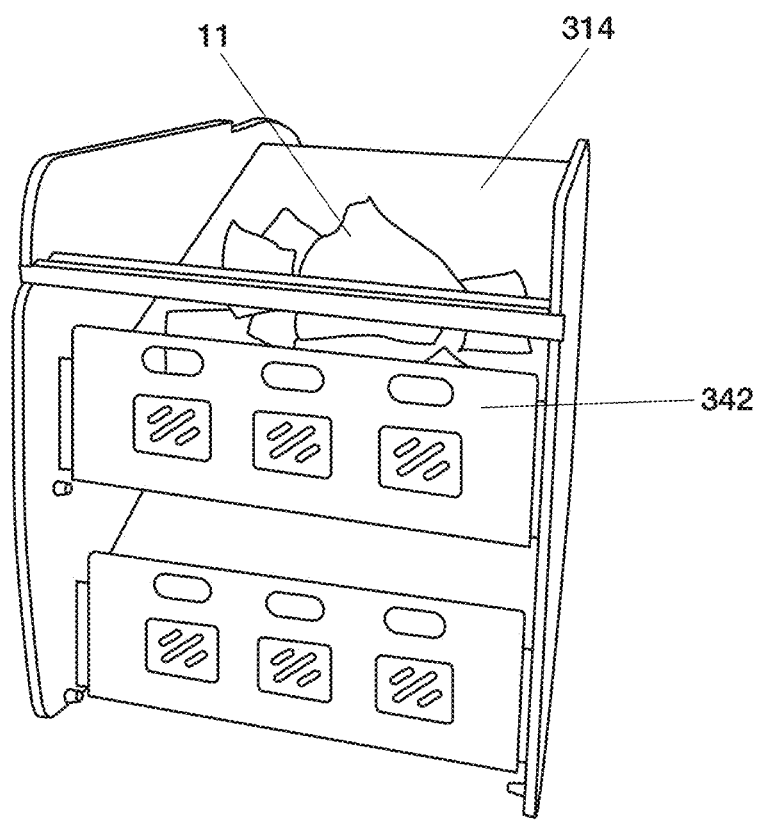
FIG. 5 is a rear perspective view of the embodiment introduced in FIG. 4.
Figure 7:
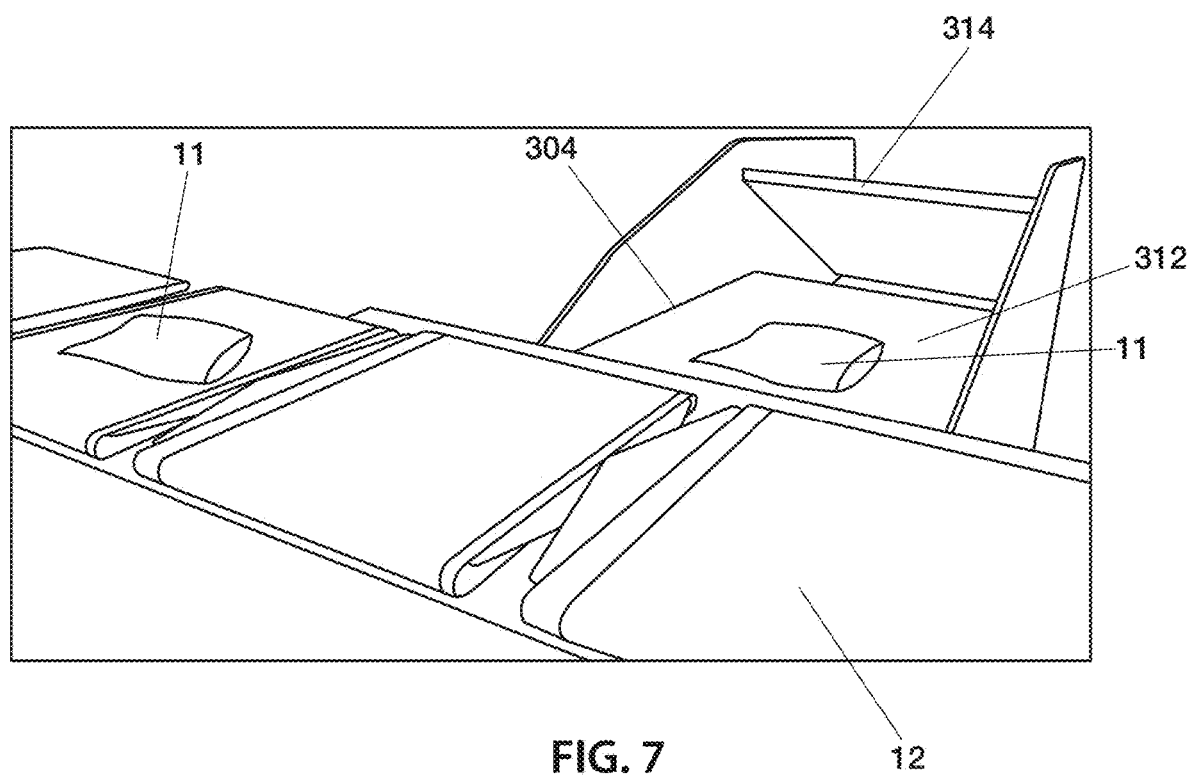
FIG. 7 is a front view of the embodiment introduced in FIG. 6.
Figure 8:
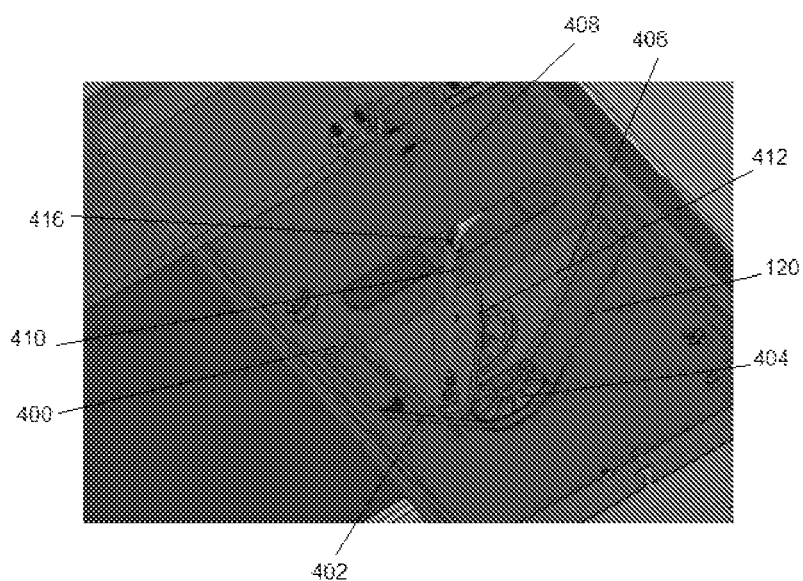
FIG. 8 is a bottom view of one embodiment of a positioner assembly according to the disclosure.
Figure 9:
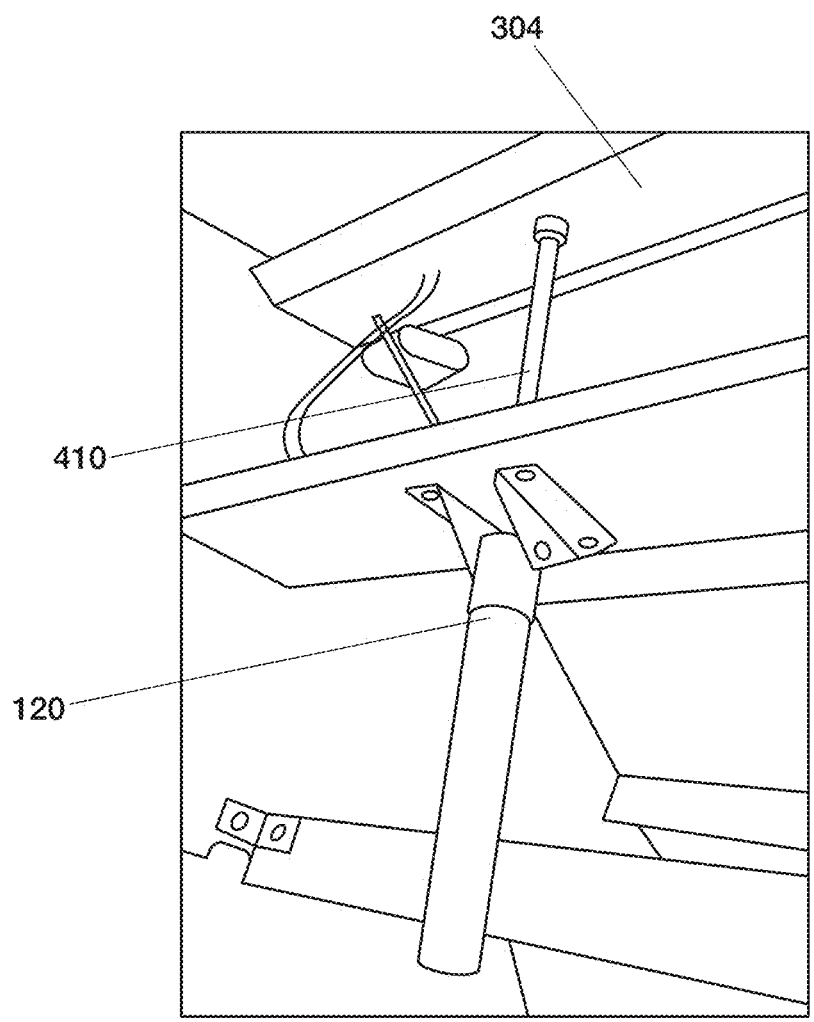
FIG. 9 is a side perspective view of one embodiment of a positioner assembly introduced in FIG. 8.
Figure 9A:
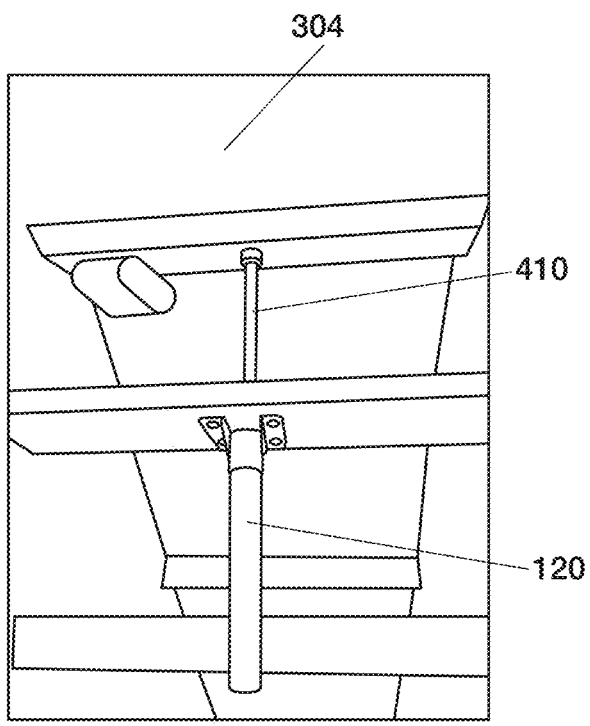
FIG. 9a is a front perspective view of one embodiment of a positioner assembly introduced in FIG. 8.
Figure 9B:
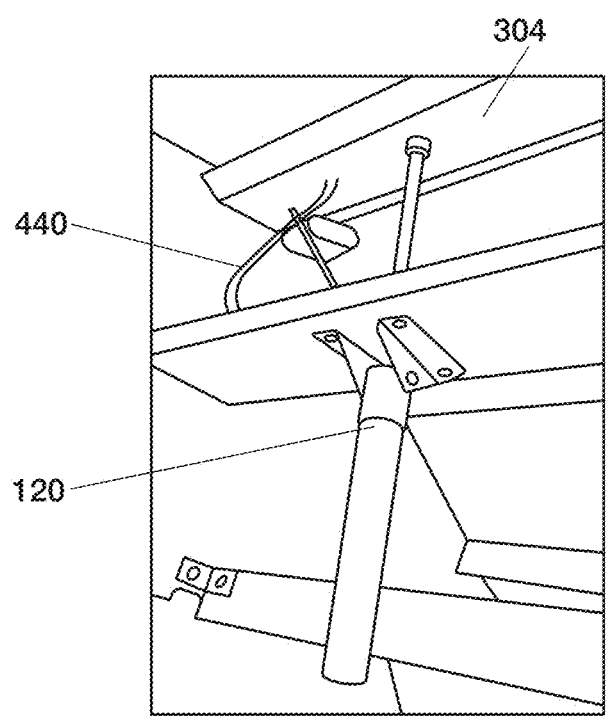
FIG. 9b is a side perspective view of one embodiment of a positioner assembly introduced in FIG. 8.
Figure 10:
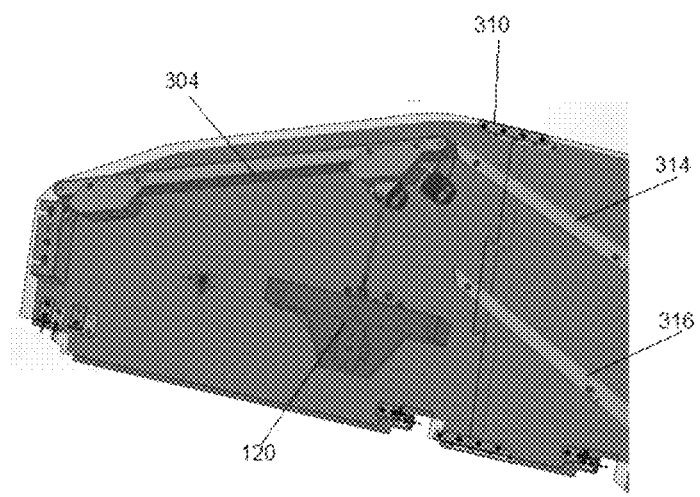
FIG. 10 is a side perspective view of one embodiment of a positioner assembly introduced in FIG. 8 in a first position.
Figure 11:
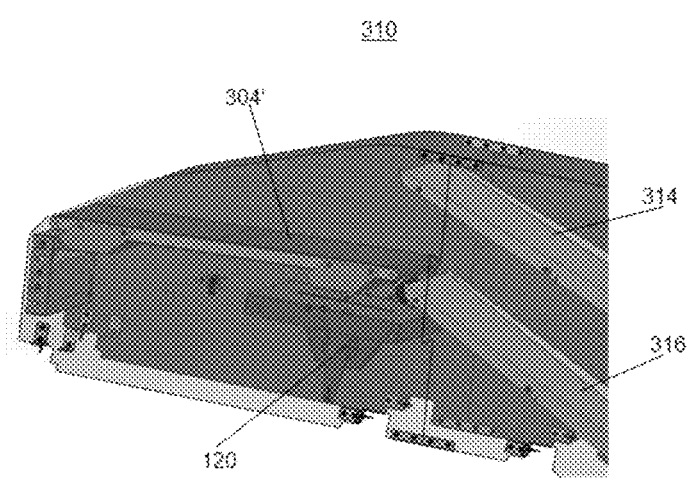
FIG. 11 is a side perspective view of one embodiment of a positioner assembly introduced in FIG. 8 in a second position.

One embodiment of a transition multi-position chute 310 is introduced in FIGS. 2 and 3 according to the present inventions. FIG. 3 illustrates the transition zone dual-position chute embodiment in a first discharge position and illustrates the embodiment in a second discharge position. Those skilled in the art having the benefit of this disclosure will recognize additional discharge/sorting positions to correspond to any number or arrangement of collectors discussed and illustrated herein. As shown, the multi-positionable sorting chute 310 generally diverts parcel packages/objects from cart 20, or in alternative embodiments from a cross belt, to a first collector discharge (i.e. as illustrated in FIGS. 4 and 5 in the first discharge position) and at least one spatially-separated, second collector discharge (i.e. illustrated in FIGS. 6 and 7 as the second discharge position). However, other embodiments include diverting packages/objects between three or more discharge collectors, i.e. in three or more discharge collector positions.

As illustrated in FIGS. 2-7, in one embodiment, a sorting conveyor system 10 includes a conveying track 12; a plurality of tilt trays 20 having a discharge; and a powered discharge diverter 304 adjacent the tilt tray discharge to receive an item 11 from tilt tray 12. The powered discharge diverter 304 thereby selectively diverts item 11 between a plurality of substantially parallel downstream collectors 314, 316.

In one example, the collector assembly may include a first bulk collector having a collector access 342. In certain examples, the collector assembly may include a second bulk collector substantially parallel to the first bulk collector and having a collector access 348. The powered discharge diverter 304 may deliver a predetermined acceleration profile. The acceleration profile may correspond to any item 11 characteristic shown and described herein that is discharged from tilt tray 20. Similarly, the powered discharge diverter 304 may deliver a predetermined deceleration profile. The deceleration profile may correspond to a predetermined item characteristic discharged from tilt tray 20.

In certain examples, the discharge diverter may provide a variable discharge speed. The variable discharge speed may dampen a speed of a predetermined item 11 exiting the tilt tray or cross belt. The variable discharge speed may correlate to variable downstream chutes 314, 316 or the like. In certain examples, the powered discharge diverter 304 may divert to an alternative position that is generally independent of item 11 location on the system. For instance, the powered discharge diverter 304 may divert to an alternative position before item 11 enters (fully or partially) a collector, clears a downstream chute, or the like. The powered discharge diverter 304 may further divert to an alternative position independent of a visual indicator, for instance certain examples may be free of visual eye indicators, optical readers, and the like.

In one embodiment, a sorting conveyor system 10 includes a conveying track 12; at least one cross belt having a discharge; and a powered discharge diverter 304 adjacent the tilt tray discharge to receive an item 11 from the cross belt discharge. The powered discharge diverter 304 thereby selectively diverts item 11 between a plurality of substantially parallel downstream collectors 314, 316.

Typically the powered discharge diverter 304 provides a variable discharge speed. The variable discharge speed may dampen a speed of an item 11 exiting the track, unloading station, or the like. The variable discharge speed may support variable downstream chutes. The variable downstream chutes may be an inclined discharge chute, a declined discharge chute, the like, and a combination thereof. Applicant has unexpectedly discovered advantages of the freedom to incorporate inclined (versus traditional decline) chutes, as well as shortened chutes and lower track elevations with the unexpected results of the invention shown and described herein.

In certain examples, the apparatus includes a sidewall assembly. The sidewall assembly may include an upstream sidewall 352 extending substantially along the length of discharge diverter 304. Further, the sidewall assembly may include a downstream sidewall 354 extending substantially downstream of discharge diverter 304 into any of the collectors shown and described herein, including but not limited to collector chutes 314, 316.

Fixed base assembly 302 may include a variety of shapes, styles and sizes of foundations to support the intended sorting application, including but not limited to a low elevation system unknown in traditional systems and arrangements. For example, the fixed base assembly 302 may support the transition chute 310 substantially perpendicularly adjacent to the conveying system, i.e. cart's 20 or associated cross belt, for parcel handling, and in particular small/unique characteristic parcel discharge and sorting. As shown, some examples of fixed base assembly 302 include chute supports 320.

As shown in FIGS. 8-11, a positioner assembly 120 may selectively position the discharge diverter 304 between a first position and at least one spaced second discharge position. Applicant has unexpectedly discovered advantages of a slider crank positioner assembly to provide any of the efficiency and/or acceleration and deceleration profiles shown and described herein. Further elements of a positioner assembly useful in embodiments herein are described in U.S. Pat. No. 6,715,599 entitled CONVEYOR SYSTEM HAVING AN IMPROVED CHUTE, issued Apr. 6, 2004, which is hereby incorporated by reference in its entirety.

Any of the transition zone position 310 shown and described herein may discharge small parcel packages/objects, for instance having light weight, plastic or similar related coverings, or other characteristic substantially into a collection assembly that is free of secondary downstream chutes. However, in yet alternative examples, a dual-position chute may include multiple secondary downstream chutes as seen in U.S. Pat. No. 7,597,185 entitled CONVEYOR AND AIR FILM CHUTE, issued Oct. 3, 2009, which is hereby incorporated by reference in its entirety.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size and arrangement of parts, within the principle of the disclosure, to the full extent indicated by the broad general meaning of the terms in which the general claims are expressed. It is further noted that, as used in this application, the singular forms "a," "an,"

and "the" include plural referents unless expressly and unequivocally limited to one referent.

In any of the embodiments herein, the sortation tray may include one or more (tray) gap fillers to provide a substantially planar traversing barrier between the upper surface of cart 20 and lower components during any of the actuation or movement about any travel configuration shown and described herein.

A variety of buss rail arrangements may provide electrical power to the sortation tray, including contactless electrical systems and contact electrical systems as understood by those skilled in the art having the benefit of this disclosure.

As can be seen in the drawings, the tray 40 may be planar or may also include upwardly angled lateral wings to help prevent packages 11 from accidentally falling off the tray 40. These wings also decrease the angle of the slope created when the tray 40 is tilted, which helps with gentle handling of the packages 11 as they are discharged from the cart 20.

When a carrying tray 40 reaches a particular destination unloading station, the tilting mechanism tilts the carrying tray 40 to cause a package 11 carried thereon to be discharged into the unloading station. A tilting mechanism is generally mounted on each conveyor cart 20.

Additionally, the invention may further include a drive motor for moving the conveyor carts around the track. The drive motors may include an opposed roller motor assembly, which move the conveyor carts along the conveyor track 12 by the opposed roller motor assembly. A driven fin, which is attached to the bottom of each conveyor cart 20, hangs between the two drive roller assemblies.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

We claim:

1. A sorting conveyor system comprising:
   (a) a conveying track;
   (b) at least one unloading station; and
   (c) a discharge diverter being noncontinuous about said conveying track and having a powered belt assembly upper surface spaced between opposing walls and having a variable discharge speed being variably dependent on an item from said unloading station, and wherein said independent discharge diverter powered belt assembly upper surface having a proximate portion substantially parallel with said conveying track to receive said item and selectively diverting said item between a first collector and a substantially vertically offset second collector.

2. The apparatus according to claim 1, further including a positioner assembly adapted for selectively positioning said discharge diverter between said first collector and said second substantially vertically offset second collector.

3. The apparatus according to claim 2, wherein said positioner assembly includes a slider crank assembly adapted to selectively position the discharge diverter between at least two substantially parallel collector axes.

4. The apparatus according to claim 1, wherein said discharge diverter delivers a smooth acceleration profile.

5. The apparatus according to claim 1, wherein said discharge diverter delivers a smooth deceleration profile.

6. The apparatus according to claim 1, wherein said discharge diverter provides a variable discharge speed adapted to dampen a speed of an item exiting said track.

7. A transition zone multi-position chute for receiving an item discharged at an unloading station by a sorting conveyor system having a conveyor track, said transition zone multi-position chute comprising:
   (a) an inlet adjacent to and noncontinuous about said conveying track at said unloading station for receiving said item;
   (b) a powered positionable discharge diverter having a powered upper belt surface speed dependent on said item and spaced between opposing stationary walls; and
   (c) a plurality of collectors downstream of said powered positionable discharge diverter.

8. The apparatus according to claim 7, wherein said powered positionable discharge diverter diverts to an alternative position independent of said product item location on said apparatus.

9. The apparatus according to claim 8, wherein said powered positionable discharge diverter diverts to an alternative position before an item enters a collector.

10. The apparatus according to claim 9, wherein said powered positionable discharge diverter diverts to an alternative position before an item clears a downstream chute.

11. The apparatus according to claim 7, wherein said powered positionable discharge diverter diverts to an alternative position independent of an electronic indicator.

12. The apparatus according to claim 7, wherein said powered positionable discharge diverter is selectively positionable between at least two parallel planes, and wherein said two parallel planes correspond to a first collector chute and a second collector chute.

13. The apparatus according to claim 7, wherein said powered positionable discharge diverter surface includes a powered belt.

14. The apparatus according to claim 7, wherein said positioner assembly comprises a slider crank assembly.

15. The apparatus according to claim 7, including a sidewall assembly having
   a. an upstream sidewall extending substantially along the length of said discharge diverter; and
   b. a downstream sidewall extending substantially downstream of said discharge diverter.

16. The apparatus according to claim 7, including a plurality of powered positionable discharge diverters.

17. A sorting conveyor system comprising:
   (a) a conveying track;
   (b) at least one cross belt having a discharge; and
   (c) a powered discharge diverter being noncontinuous about said conveying track and having a variably powered upper belt assembly surface adjacent said discharge adapted to receive an item from said discharge, said powered discharge diverter selectively diverting said item between a plurality of substantially parallel downstream collectors.

18. The system according to claim 17, including a positioner assembly adapted for selectively positioning said powered discharge diverter between said plurality of collectors.

19. The system according to claim 17, including a collector assembly positioned adjacent to said powered discharge diverter.

20. The system according to claim 17, wherein said powered discharge diverter delivers a predetermined acceleration profile and a predetermined deceleration profile.

\* \* \* \* \*